(12) United States Patent
Peng

(10) Patent No.: US 7,626,736 B2
(45) Date of Patent: Dec. 1, 2009

(54) SCANNING APPARATUS

(76) Inventor: Wen-Yuan Peng, No.21, Lane 38, Sinmin St., Jhubei City, Hsinchu County (TW)

( * ) Notice: Subject to any disclaimer, the term of this patent is extended or adjusted under 35 U.S.C. 154(b) by 864 days.

(21) Appl. No.: 10/960,100

(22) Filed: Oct. 8, 2004

(65) Prior Publication Data

US 2006/0077476 A1 Apr. 13, 2006

(51) Int. Cl.
*H04N 1/04* (2006.01)
*H04N 1/32* (2006.01)
(52) U.S. Cl. ............... 358/474; 358/497; 358/468; 358/442
(58) Field of Classification Search ............ 379/100.01, 379/100.02, 67.1
See application file for complete search history.

(56) References Cited

U.S. PATENT DOCUMENTS

| | | | |
|---|---|---|---|
| 5,282,238 A * | 1/1994 | Berland .................... 455/557 |
| 5,940,185 A * | 8/1999 | Inoue et al. ................. 358/296 |
| 6,246,490 B1 * | 6/2001 | Sebestyen .................. 358/425 |
| 6,775,033 B1 * | 8/2004 | Nobuta et al. ............... 358/468 |
| 2002/0057457 A1 * | 5/2002 | Nozaki et al. .............. 358/1.18 |
| 2005/0007613 A1 * | 1/2005 | Fritz et al. ................. 358/1.13 |
| 2005/0157882 A1 * | 7/2005 | Hou ............................ 381/1 |
| 2006/0092480 A1 * | 5/2006 | Cui et al. ................... 358/474 |

FOREIGN PATENT DOCUMENTS

JP  2003250019 A  *  9/2003

* cited by examiner

*Primary Examiner*—Cheukfan Lee
(74) *Attorney, Agent, or Firm*—Perkins Coie LLP

(57) ABSTRACT

A scanning apparatus includes a scanning structure and an audio broadcasting structure. The scanning structure includes a body and a data processing unit located in the body. The audio broadcasting structure includes a sound-generation assembly and a cabinet. The sound-generation assembly is located in the body, is electrically connected to the data processing unit, and generates sound after the data processing unit has emitted audio signals. The cabinet occupies the interior space of the scanning apparatus not occupied by other elements to function as a sound resonant space for the sound-generation assembly.

19 Claims, 5 Drawing Sheets

SCANNING APPARATUS

FIELD OF THE INVENTION

The invention relates to a scanning apparatus, and particularly to a scanning apparatus equipped with an audio broadcasting structure to broadcast sound in addition to performing scan functions.

BACKGROUND OF THE INVENTION

Photoelectric technology has spawned a wide variety of digital products, such as scanners, digital cameras, digital video cameras, and the like. Scanners can rapidly transform paper documents to electronic files and have been widely used in paperless office environments.

Refer to FIG. 1 for a conventional scanning apparatus 1, which includes at least a body 11, a lid 12, a carrier 13 for holding an optical module, a transport mechanism 14, a human-machine interface 15, a data processing unit 16 and connection lines 17 and 18. The body 11 has a scan window 111 that is permeable to light. The lid 12 is pivotally coupled on one side of the body 11. The carrier 13, transport mechanism 14, data processing unit 16 and connection lines 17 and 18 are housed in the body 11. The transport mechanism 14 is coupled on the carrier 13 to move the carrier 13 reciprocally within the range of the scan window 111. The data processing unit 16 is connected electrically to the carrier 13 and the human-machine interface 15 through the connection lines 17 and 18. When users operate the human-machine interface 15 through the connection line 18, the data processing unit 16 drives the carrier 13 through the connection line 17 to move along the transport mechanism 14 to scan a scanning document (not shown in the drawing) by projecting light through the scan window 111.

The optical module determines the scanning quality of the scanning apparatus 1. As the optical module is movable, to prevent the optical module from losing focus or being damaging during transportation, the carrier 13 or the optical module is generally coupled by a locking structure 131 before shipping from the plant so that the carrier 13 (or the optical module) is fixed during transportation or moving to avoid damage.

Furthermore, the scanning apparatus 1 is generally quite bulky. When the scanning apparatus 1 is not used, the interior space of the scanning apparatus 1 not filled with scanner elements is not fully utilized.

SUMMARY OF THE INVENTION

Therefore the primary object of the invention is to provide a scanning apparatus that includes an audio broadcasting structure to provide audio broadcasting function in addition to the scanning function.

The scanning apparatus according to the invention includes a scanning structure and an audio broadcasting structure. The scanning structure includes a body and a data processing unit housed in the body. The audio broadcasting structure includes a sound generation assembly and a cabinet.

The sound generation assembly is located on two opposite sides of the body, and includes a connection line, a sound-generating device and an audio output port. The connection line is located in the body and electrically connects the data processing unit to the sound-generating device. The sound-generating device is a Mylar Speaker and also is located in the body. After having received audio signals from the data processing unit through the connection line, the sound-generating device produces sound. The audio output port corresponds to the sound-generating device and broadcasts the sound generated by the sound-generating device outside the body.

The cabinet is formed by the interior space of the scanning apparatus not filled with scanner elements. It functions as a sound resonant chest for the sound generated by the sound-generating device.

A recorder and playback unit that provides radio receiving, recording and playing functions may also be included and located on another side of the body to function as a general recorder and playback unit. It is electrically connected to the data processing unit through a connection line.

The scanning apparatus according to the invention can fully utilize the interior space not occupied by the scanner elements to function as a cabinet. The audio broadcasting structure provides audio broadcasting function so that users do not have to purchase an additional sound-generating device. Also, the extra space that might otherwise be required to accommodate the sound-generating device may also be saved.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
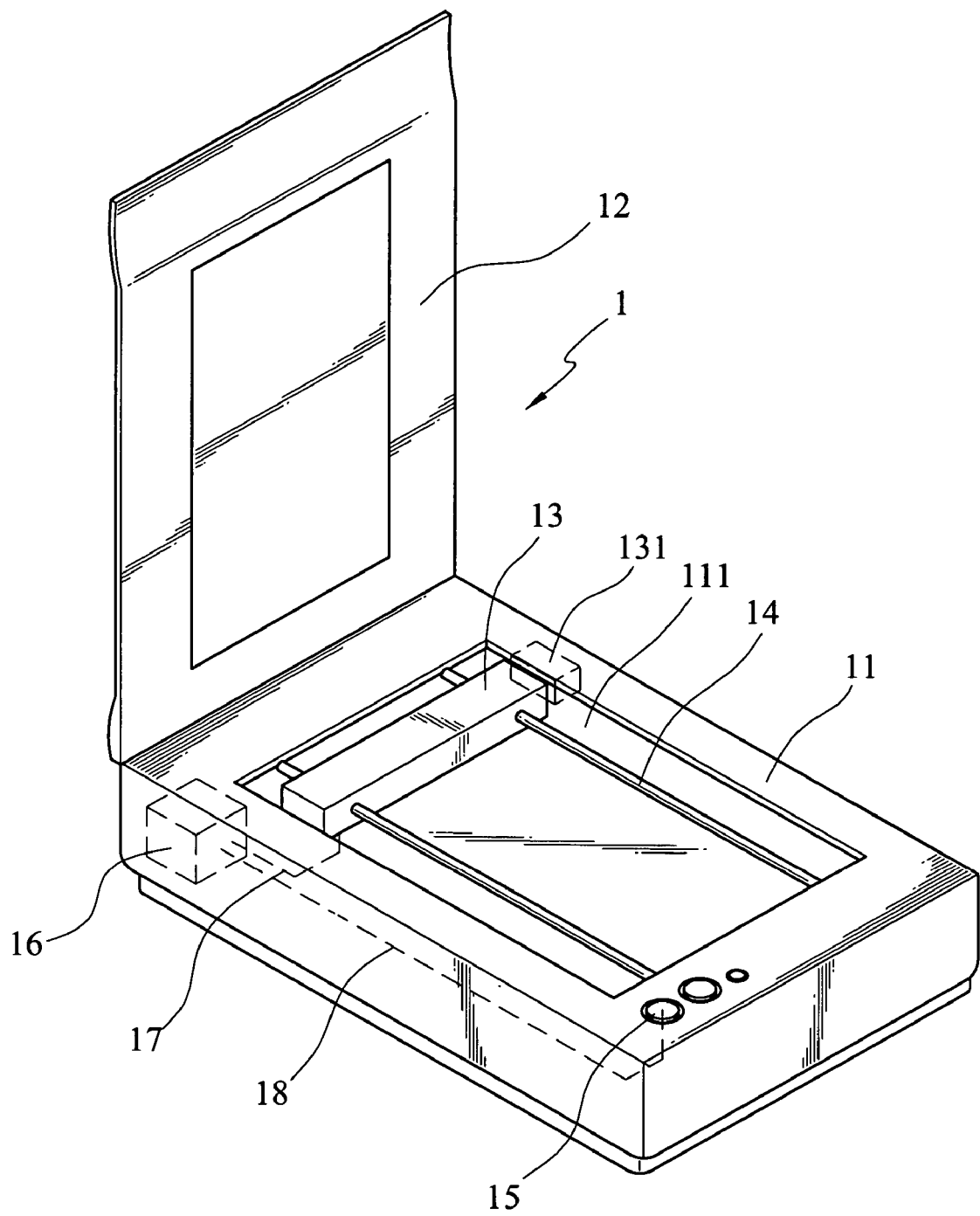
FIG. 1 is a schematic view of a conventional scanning apparatus.
Figure 2:
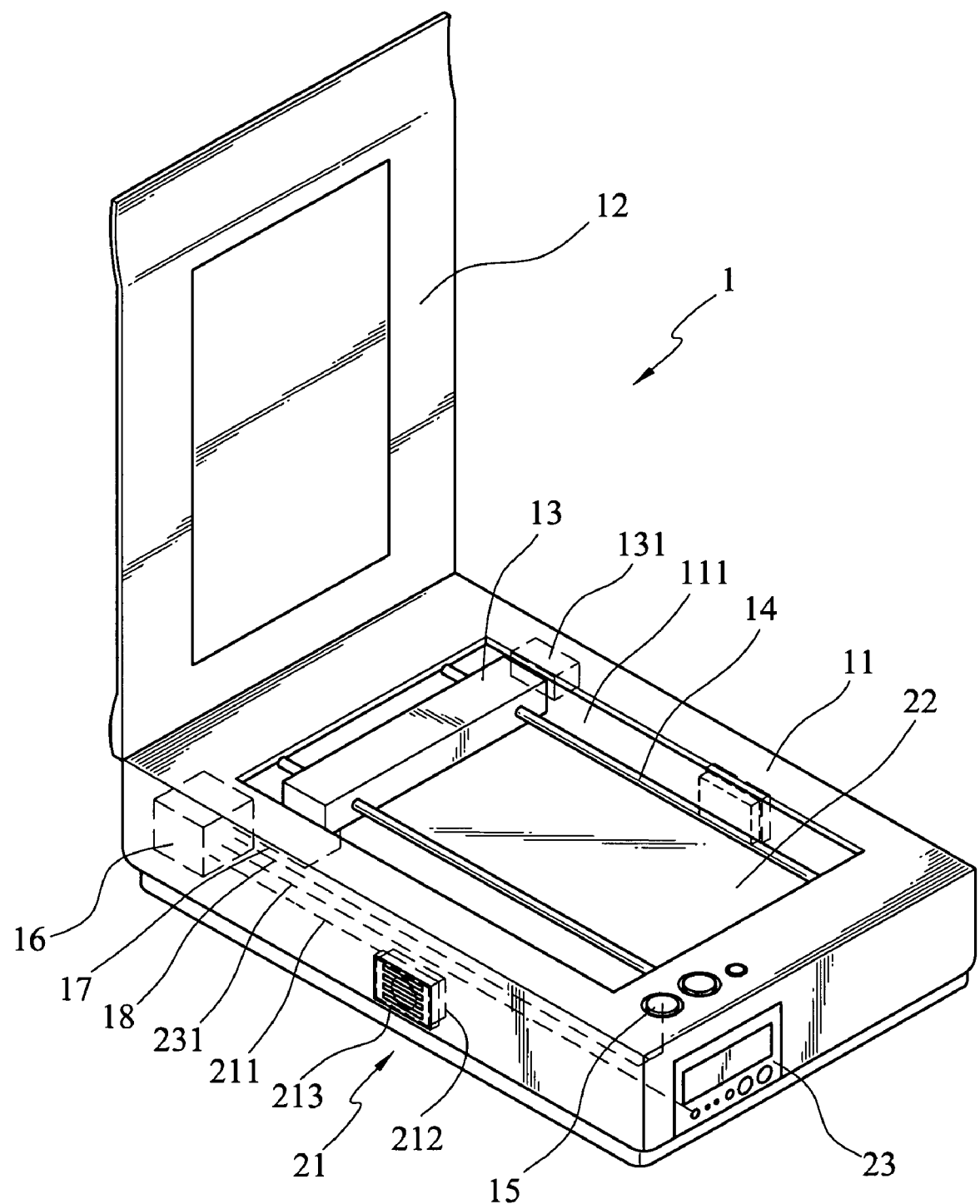
FIG. 2 is a schematic view of a first embodiment of the scanning apparatus of the invention.

Refer to FIG. 2 for a first embodiment of the scanning apparatus of the invention. It includes a scanning structure and an audio broadcasting structure to provide scanning and audio broadcasting functions. The scanning structure 1 includes at least a body 11, a lid 12, a carrier 13 for holding an optical module, a transport mechanism 14, a human-machine interface 15, a data processing unit 16, connection lines 17 and 18, a sound generation assembly 21, a cabinet 22 and a recorder and playback unit 23.

The scanning structure that provides the scanning function adopts a conventional technique, and includes the body 11, which has a scan window 111 that is permeable to light, and the lid 12 pivotally coupled on one side of the body 11. The carrier 13 holding the optical module, transport mechanism 14, data processing unit 16, and connection lines 17 and 18 are housed in the body 11. The transport mechanism 14 is coupled on the carrier 13 to move the carrier 13 reciprocally within the range of the scan window 111. The data processing unit 16 is electrically connected to the carrier 13 and human-machine interface 15 through the connection lines 17 and 18. When in use, users operate the human-machine interface 15, and through the connection line 18, the data processing unit 16 drives the carrier 13 through the connection line 17 to move along the transport mechanism 14 and scan a scanning document (not shown in the drawing) by projecting light through the scan window 111.

The optical module determines the scanning quality of the scanning apparatus 1. As the optical module is movable, to prevent the optical module from losing focus or being damaging during transportation, the carrier 13 or the optical module is generally coupled by a locking structure 131 before shipping from the plant so that the carrier 13 (or the optical module) is fixed during transportation.

Figure 5A:
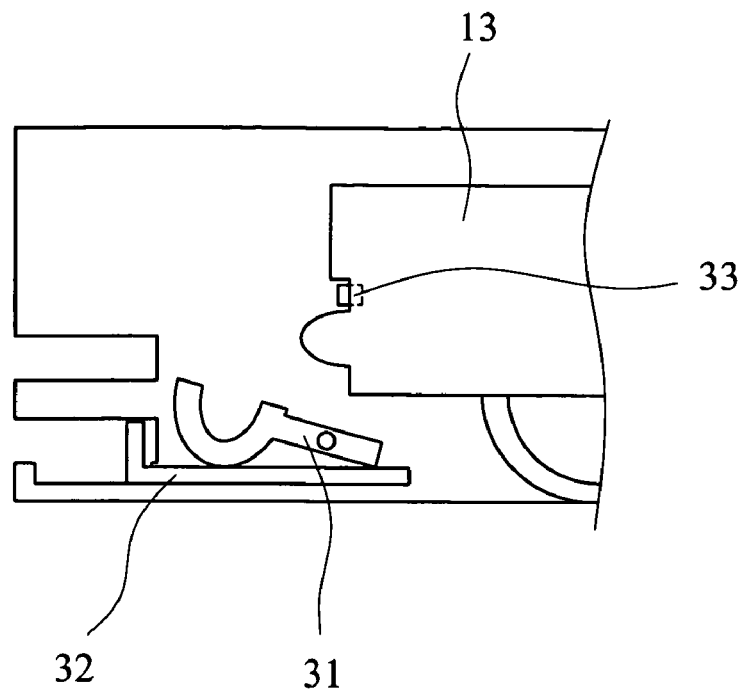
FIG. 5A and FIG. 5B is a locking structure of the invention.
Figure 5B:
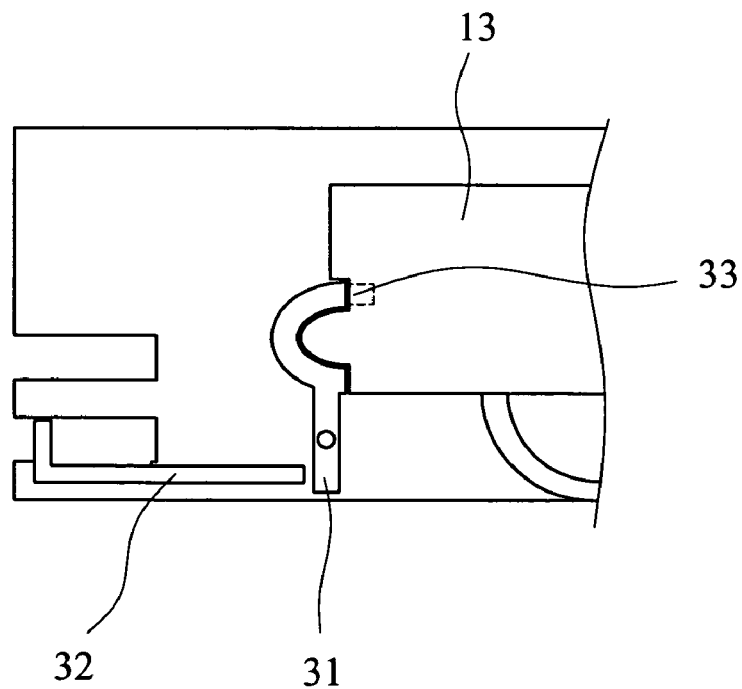

Refer to FIG. 5A and FIG. 5B for a locking structure of the invention. The locking structure 131 includes a latch member 31 and a push rod 32. The latch member 31 is located on one end of the scanning structure where the carrier 13 is positioned, and has one swiveling end to selectively lock or release the carrier 13. The carrier 13 has a switch 33 corresponding to the latch member 31 to switch to the audio broadcasting function. Namely, when the latch member 31 locks the carrier 13, the audio broadcasting structure can generate sound. When the latch member 31 releases the latch member 13, the audio broadcasting structure does not generate sound. The push rod 32 is movably located on one side of the body 11 to push another end of the latch member 31 to release the carrier 13.

The audio broadcasting structure of the invention includes the sound-generation assembly 21, the cabinet 22 and the record and playback unit 23.

The sound-generation assembly 21 is located on two opposite sides of the body 11 and includes a connection line 211, a sound-generating device 212 and an audio output port 213. The connection line 211 is electrically connected to the data processing unit 16 and the sound-generating device 212, and is located on two inner sides of the body 11. The sound-generating device 212 is a Mylar Speaker and is located in the body 11 to receive audio signals from the data processing unit 16 through the connection line 211 and generate sound. The audio output port 213 corresponds to the sound-generating device 212 and is located on two opposite outer sides of the body 11 to broadcast the sound generated by the sound-generating device 212 outside the body 11.

The cabinet 22 occupies the interior space of the scanning apparatus 1 not occupied by other elements. It functions as a resonant chest for the sound generated by the sound-generating device 212.

The recorder and playback unit 23 provides radio receiving, recording and playing functions like a general recorder and playback unit. It is located on another side of the body 11 and is electrically connected to the data processing unit 16 through the connection line 231.

Of course, when the scanning structure performs scanning functions, the audio broadcasting function of the audio broadcasting structure has to be shut down. Also, when the broadcasting structure is broadcasting, the scanning function of the scanning structure is disabled. This can be achieved through the locking structure 131 (namely through the latch member 31 to switch to the broadcasting function of the audio broadcasting structure). The scanning and audio broadcasting functions cannot be operated at the same time, as the sound resonance of the cabinet 22 affects scanning quality, and the movement of the carrier 13 also alters the resonant space of the cabinet 22 and affects the audio broadcasting quality.

Figure 3:
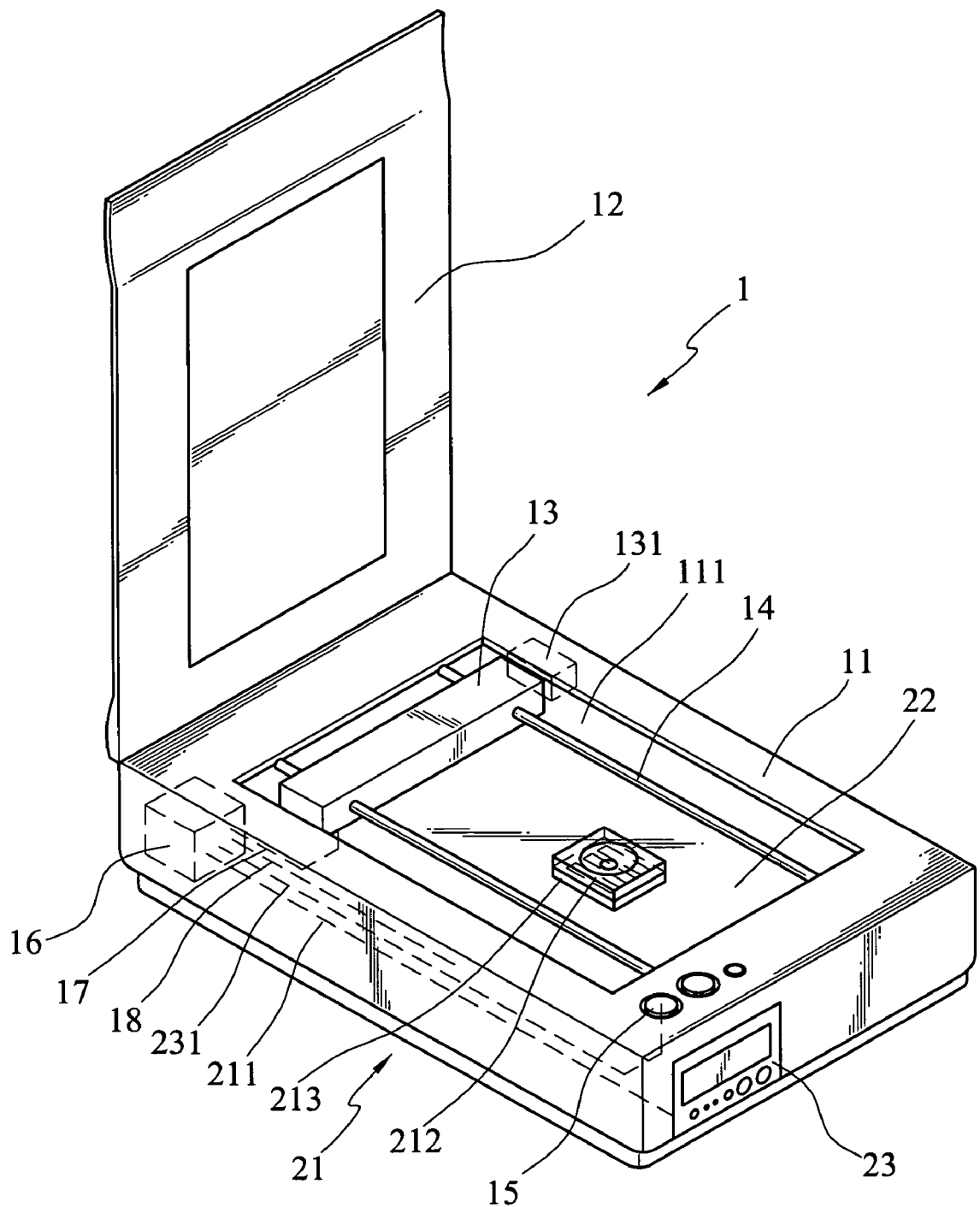
FIG. 3 is a schematic view of a second embodiment of the scanning apparatus of the invention.

Refer to FIG. 3 for a second embodiment of the scanning apparatus of the invention. It also includes a scanning structure and an audio broadcasting structure to provide scanning and audio broadcasting functions. The scanning structure is substantially constructed like the first embodiment previously discussed.

However, the audio broadcasting structure includes a sound-generation assembly 21, a cabinet 22 and a recorder and playback unit 23.

The sound-generation assembly 21 includes a connection line 211, a sound-generating device 212 and an audio output port 213. The connection line 211 is electrically connected to the data processing unit 16 and the sound-generating device 212, which is located in the body 11. The sound-generating device 212 is a Mylar Speaker which is located on the bottom of the body 11 to receive audio signals from the data processing unit 16 through the connection line 211 and generate sound. The audio output port 213 is located on an outer side of the bottom of the body 11 to broadcast the sound generated by the sound-generating device 212 outside the body 11.

The cabinet 22 occupies the interior space of the scanning apparatus 1 not occupied by other elements. It functions as a resonant chest for the sound generated by the sound-generating device 212.

The recorder and playback unit 23 provides radio receiving, recording and playing functions like a general recorder and playback unit. It is located on another side of the body 11 and is electrically connected to the data processing unit 16 through a connection line 231.

Of course, when the scanning structure performs scanning functions, the audio broadcasting function of the audio broadcasting structure has to be shut down. Also, when the broadcasting structure is broadcasting, the scanning function of the scanning structure is disabled. This can be achieved through the locking structure 131 (namely through the latch member 31 to switch to the broadcasting function of the audio broadcasting structure). The scanning and audio broadcasting functions cannot be operated at the same time, as the sound resonance of the cabinet 22 affects scanning quality, and the movement of the carrier 13 also alters the resonant space of the cabinet 22 and affects audio broadcasting quality.

Figure 4:
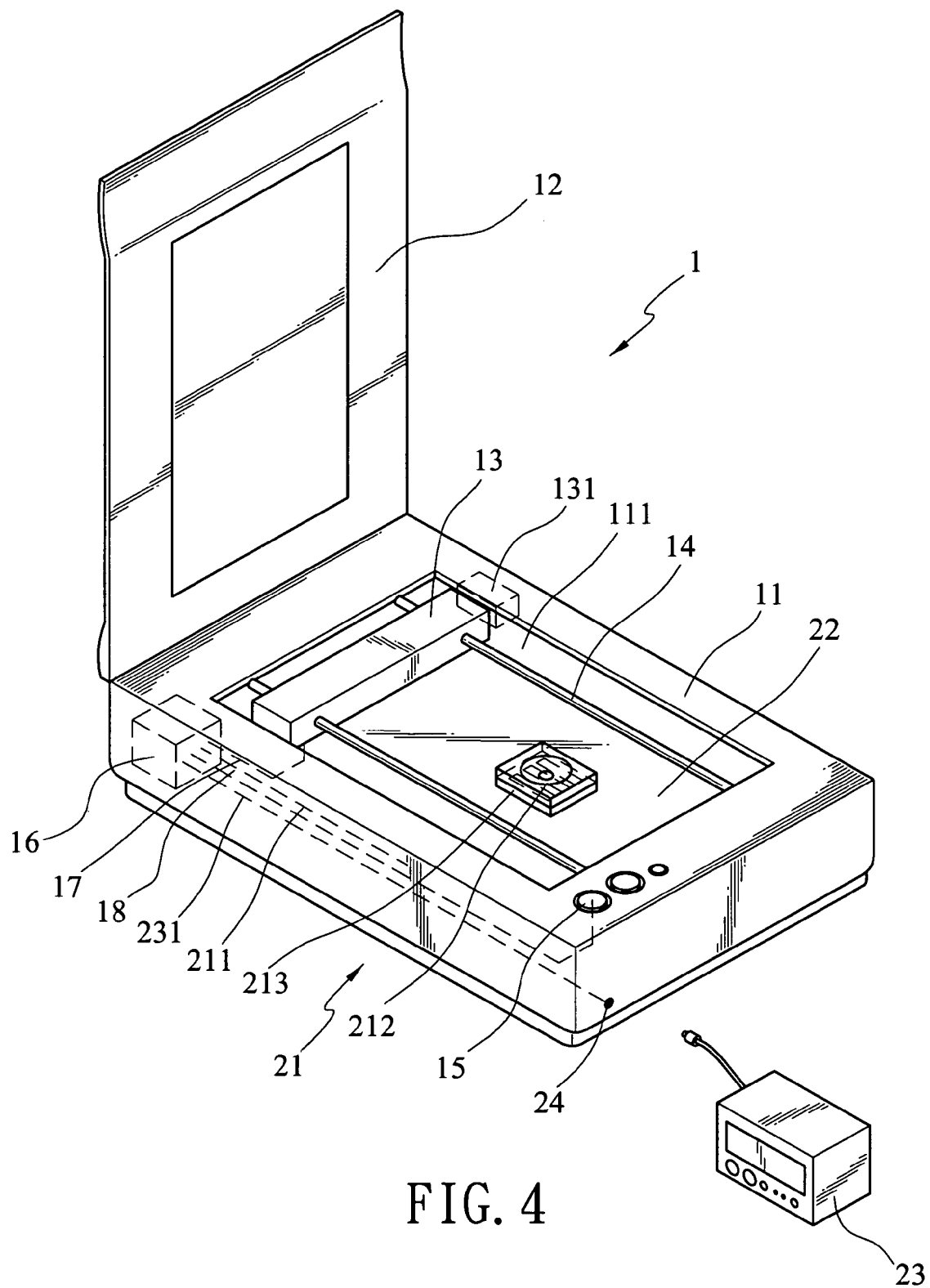
FIG. 4 is a schematic view of a third embodiment of the scanning apparatus of the invention.

Refer to FIG. 4 for a third embodiment of the scanning apparatus of the invention. The recorder and playback unit 23 is externally connected to the scanning apparatus 1. The scanning apparatus 1 has a connector 24 to electrically connect to the data processing unit 16 though a connection line 231. The recorder and playback unit 23 is connected externally.

In summary, the invention can fully utilize the interior space of the scanning apparatus 1 not occupied by other elements to function as the cabinet 22 to broadcast sound. Users do not have to purchase additional sound generation equipment and also do not have to allocate additional space to install the sound generation equipment. Thus the invention can save a great deal of space.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A scanning apparatus comprising:
    a scanning structure comprising a body and a data processing unit carried by the body, wherein the body comprises an exterior surface opposite an interior surface, wherein the interior surface defines an interior space in the body, the interior space comprising a first portion and a second portion, and wherein elements of the scanning structure occupy the first portion of the interior space, and the second portion of the interior space is a sound resonant space; and
    an audio broadcasting structure carried by the body, wherein the audio broadcasting structure comprises a sound generation assembly configured to generate sound in response to audio signals from the data processing unit, and wherein the sound generation assembly comprises:
a connection line electrically connected to the data processing unit;
a sound-generating device electrically connected to the connection line and configured to generate sound in response to the audio signals, wherein the sound-generating device is located at the interior surface of the body; and
an audio output port located at the exterior surface of the body at a location generally opposite the sound generating device, wherein the audio output port is configured to broadcast the sound outside the body.

2. The scanning apparatus of claim 1, wherein the sound-generating device is a Mylar speaker.

3. The scanning apparatus of claim 1 wherein the body further comprises first and second side portions extending from a bottom portion, and wherein the sound-generating device is located at the interior surface of the bottom portion of the body, and wherein the audio output port is located at the exterior surface of the bottom portion of the body.

4. The scanning apparatus of claim 1-2 wherein the connection line is a first connection line, and wherein the audio broadcasting structure further comprises a recorder and playback unit which is electrically connected to the data processing unit through a second connection line to provide at least one of radio receiving, recording, and broadcasting functions.

5. The scanning apparatus of claim 1, further comprising a locking structure configured to switch the audio broadcasting structure from a non-broadcast mode to a broadcast mode.

6. A scanning apparatus comprising:
a scanning structure comprising a body and a data processing unit carried by the body, wherein the body defines an interior space therein, and the interior space comprises a first portion and a second portion, wherein elements of the scanning structure occupy the first portion of the interior space, and the second portion of the interior space is a sound resonant space; and
an audio broadcasting structure carried by the body, wherein the audio broadcasting structure comprises:
a sound generation assembly configured to generate sound in response to audio signals from the data processing unit:
a connector electrically connected to the data processing unit through a connection line; and
a recorder and playback unit positioned external to the body, wherein the recorder and playback unit is configured to be connected to the connector.

7. The scanning apparatus of claim 6 wherein the connector is configured to transmit a radio signal to the data processing unit from the recorder and playback unit.

8. The scanning apparatus of claim 6 the body includes an interior surface opposite an exterior surface, and wherein the sound generation assembly includes a sound generating device and an audio output port, wherein the sound generating device is positioned at the interior surface of the body and the audio output port is positioned at the exterior surface of the body at a location that is generally opposite the sound generating device.

9. The scanning apparatus of claim 8 wherein the sound generating device is a Mylar speaker.

10. A scanning apparatus comprising:
a scanning structure comprising:
a body, wherein the body defines an interior space therein, and the interior space comprises a first portion and a second portion, wherein elements of the scanning structure occupy the first portion of the interior space, and the second portion of the interior space is a sound resonant space;
a carrier movably coupled to the body, wherein the carrier includes a switch; and
a data processing unit supported by the carrier; and
an audio broadcasting structure comprising:
a sound generation assembly carried by the body and electrically connected to the data processing unit, wherein the sound generation assembly is configured to generate sound in response to audio signals from the data processing unit; and
a locking structure configured to contact the switch to activate the audio broadcasting structure to a broadcast mode, wherein the locking structure comprises:
a latch member carried by the body proximate to the carrier of the scanning structure, wherein the latch member swivels between a first position to selectively lock the carrier and contact the switch, and a second position to release the carrier and be spaced apart from the switch; and
a push rod carried by the body, wherein the push rod is movable to push an end portion of the latch member to swivel the latch member from the first position to the second position.

11. The scanning apparatus of claim 10, wherein the audio broadcasting structure is in the broadcast mode when the latch member locks the carrier and contacts the switch and the audio broadcasting structure is not in the broadcast mode when the latch member releases the carrier and is spaced apart from the switch.

12. A scanner comprising:
a body having an exterior surface opposite an interior surface, wherein the interior surface defines an interior space therein comprising a first portion and a second portion, wherein elements of the scanner occupy the first portion of the interior space, and the second portion of the interior space is a sound resonant space;
a scanning assembly carried by the body;
a data processing unit carried by the body; and
a sound generating assembly carried by the body, wherein the sound generating assembly generates sound in response to an audio signal from the data processing unit, and wherein the sound generating assembly comprises:
a sound generating device positioned at the interior surface of the body, wherein the sound generating device is electrically connected to the data processing unit via a connection line; and
an audio output port positioned at the exterior surface of the body at a location generally opposite the sound generating device.

13. The scanner of claim 12, further comprising:
a connector electrically connected to the data processing unit; and
a recorder and playback unit positioned externally to the body, wherein the recorder and playback unit is configured to be coupled to the connector.

14. The scanner of claim 12 wherein the sound generating device is a first sound generating device, and wherein the sound generating assembly further comprises a second sound generating device positioned at the interior surface of the body spaced apart from the first sound generating device.

15. The scanner of claim 14 wherein the audio output port is a first audio output port posited at a first location at the exterior surface of the body, and wherein the sound generating assembly further comprises a second audio output port positioned at the exterior surface of the body at a second location generally opposite the second sound generating device.

16. A scanner comprising:
- a body defining an interior space therein comprising a first portion and a second portion, wherein elements of the scanner occupy the first portion of the interior space, and the second portion of the interior space is a sound resonant space;
- a data processing unit carried by the body;
- a sound generating assembly carried by the body that generates sound in response to an audio signal from the data processing unit;
- a scanning assembly carried by the body, wherein the scanning assembly includes a carrier with a switch configured to switch the sound generating assembly between a broadcast mode and a non-broadcast mode; and
- a locking assembly configured to activate the switch, wherein the locking assembly comprises
  - a lock member positioned on the body proximate to the carrier to selectively lock and release the carrier, and wherein the lock member contacts the switch when the lock member locks the carrier; and
  - a release member positioned on the body proximate to the lock member, wherein the release member moves the lock member to release the carrier.

17. The scanner of claim 16 wherein:
- the lock member is a latch that is pivotally coupled to the body, wherein the latch includes a first end portion spaced apart from a second end portion, and wherein the first end portion contacts the carrier and the switch when the latch locks the carrier; and
- the release member is a push rod that is slidably coupled to the body, and wherein the push rod contacts the second end portion of the latch to pivot the latch and unlock the carrier.

18. The scanner of claim 16 wherein the sound generating assembly does not generate sound after the release member moves the lock member to release the carrier.

19. The scanner of claim 16 wherein the sound generating assembly further comprises a sound generating device and an audio output port, wherein the sound generating device is positioned at an inner side of the body and the audio output port is positioned at an outer side of the body at a location generally opposite the sound generating device.

* * * * *

UNITED STATES PATENT AND TRADEMARK OFFICE
CERTIFICATE OF CORRECTION

| | | |
|---|---|---|
| PATENT NO. | : 7,626,736 B2 | Page 1 of 1 |
| APPLICATION NO. | : 10/960100 | |
| DATED | : December 1, 2009 | |
| INVENTOR(S) | : Wen-Yuan Peng | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1393 days.

Signed and Sealed this

Second Day of November, 2010

David J. Kappos
*Director of the United States Patent and Trademark Office*